(12) United States Patent
Albrecht et al.

(10) Patent No.: US 6,807,205 B1
(45) Date of Patent: Oct. 19, 2004

(54) PRECISE MONITOR ETALON CALIBRATION TECHNIQUE

(75) Inventors: Hans-Stephan Albrecht, Göttingen (DE); Uwe Stamm, Göttingen (DE); Wolfgang Zschocke, Noerten-Hardenberg (DE)

(73) Assignee: Lambda Physik AG, Goettingen (DE)

(*) Notice: Subject to any disclaimer, the term of this patent is extended or adjusted under 35 U.S.C. 154(b) by 0 days.

(21) Appl. No.: 09/903,425

(22) Filed: Jul. 10, 2001

Related U.S. Application Data

(60) Provisional application No. 60/218,417, filed on Jul. 14, 2000.

(51) Int. Cl.[7] .............................. H01S 3/00; H01S 3/10
(52) U.S. Cl. .......................................... 372/33; 372/20
(58) Field of Search ........................ 372/20, 33, 55–58, 372/38.1

(56) References Cited

U.S. PATENT DOCUMENTS

| | | | |
|---|---|---|---|
| 3,806,829 A | 4/1974 | Duston et al. ............. 331/94.5 |
| 4,016,504 A | 4/1977 | Klauminzer ............... 331/94.5 |
| 4,309,671 A | 1/1982 | Malyon .................. 331/94.5 S |
| 4,319,843 A | 3/1982 | Gornall ....................... 356/346 |
| 4,331,937 A | 5/1982 | Brown et al. .................. 372/74 |
| 4,348,647 A | 9/1982 | Nighan et al. ................. 372/74 |
| 4,393,505 A | 7/1983 | Fahlen ......................... 372/57 |
| 4,404,366 A | 9/1983 | Boguslaski et al. ......... 536/18.1 |
| 4,435,808 A | 3/1984 | Javan ........................... 372/11 |
| 4,468,773 A | 8/1984 | Seaton ......................... 372/32 |
| 4,513,422 A | 4/1985 | Buholz ......................... 372/29 |
| 4,558,952 A | 12/1985 | Kulesh et al. ............... 356/349 |
| 4,592,043 A | 5/1986 | Williams ....................... 370/3 |
| 4,611,270 A | 9/1986 | Klauminzer et al. ........ 364/183 |
| 4,616,908 A | 10/1986 | King ........................... 350/576 |
| 4,691,322 A | 9/1987 | Nozue et al. .................. 372/82 |
| 4,823,354 A | 4/1989 | Znotins et al. ................ 372/57 |
| 4,829,536 A | 5/1989 | Kajiyama et al. ............. 372/57 |
| 4,856,018 A | 8/1989 | Nozue et al. .................. 372/98 |
| 4,860,300 A | 8/1989 | Baumler et al. ............... 372/57 |
| 4,905,243 A | 2/1990 | Lokai et al. ................... 372/32 |

(List continued on next page.)

FOREIGN PATENT DOCUMENTS

| | | | |
|---|---|---|---|
| DE | P 40 29 687 A1 | 9/1990 | .......... H01S/3/082 |
| DE | 42 25 781 A1 | 8/1992 | .............. H01S/3/08 |
| DE | 41 14 407 A1 | 11/1992 | .............. G01J/9/02 |
| DE | 298 22 082 U1 | 2/1999 | .............. H01S/3/08 |
| DE | 298 22 090 U1 | 2/1999 | .............. H01S/3/08 |
| DE | 299 07 349 U1 | 7/2000 | .......... H01S/3/086 |
| EP | 0 472 727 B1 | 11/1990 | ......... H01S/3/1055 |
| EP | 0 570 243 A1 | 5/1993 | ........... H01S/3/139 |
| EP | 0 454 399 B1 | 9/1995 | ........... H01S/3/137 |
| EP | 0 855 811 A2 | 7/1998 | ........ H04B/10/145 |
| EP | 0 875 743 A1 | 11/1998 | .............. G01J/9/02 |
| EP | 0 867 989 B1 | 9/1999 | ......... H01S/3/1055 |
| EP | 1 063 503 A1 | 12/2000 | .............. G01J/9/02 |
| JP | 2-631554 | 4/1997 | ......... H01S/3/1055 |
| WO | WO 96/07224 | 3/1996 | ............. H01S/3/13 |
| WO | WO 01/18923 A1 | 3/2001 | ........... H01S/3/22 |
| WO | WO 01/46658 A1 | 6/2001 | ............. G01J/3/18 |

OTHER PUBLICATIONS

Emara, S., "Wavelength Shifts in Hg[198] as a Function of Temperature," *Journal of Research of the National Bureau of Standards—A. Physics and Chemistry*, vol. 65A, No. 6, Nov.–Dec. 1961, pp. 473–474.

(List continued on next page.)

*Primary Examiner*—Don Wong
*Assistant Examiner*—Hung Tran Vy
(74) *Attorney, Agent, or Firm*—Stallman & Pollock LLP

(57) ABSTRACT

A method for operating an excimer or molecular fluorine laser system at a stabilized wavelength includes generating a laser beam and directing a beam portion through a wavelength measurement system, calibrating the wavelength measurement system to an absolute reference, determining the wavelength of the laser beam including figuring in a drift compensation value of the wavelength, and tuning the wavelength to a target wavelength when the determined wavelength differs from the target wavelength.

19 Claims, 4 Drawing Sheets

U.S. PATENT DOCUMENTS

| | | | |
|---|---|---|---|
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 4,977,573 A | 12/1990 | Bittenson et al. | 372/81 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,144,632 A | 9/1992 | Thonn | 372/33 |
| 5,150,370 A | 9/1992 | Furuya et al. | 372/106 |
| 5,198,872 A | 3/1993 | Wakabayashi et al. | 356/352 |
| 5,218,421 A | 6/1993 | Wakabayashi et al. | 356/352 |
| 5,221,823 A | 6/1993 | Usui | 219/121.78 |
| 5,225,884 A | 7/1993 | Stark et al. | 356/73 |
| 5,226,050 A | 7/1993 | Burghardt | 372/20 |
| 5,307,364 A | 4/1994 | Turner | 372/60 |
| 5,337,330 A | 8/1994 | Larson | 372/86 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,420,877 A | 5/1995 | Sandstrom | 372/34 |
| 5,450,207 A | 9/1995 | Fomenkov | 356/416 |
| 5,450,436 A | 9/1995 | Mizoguchi et al. | 372/59 |
| 5,479,431 A | 12/1995 | Sobottke et al. | 372/92 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,596 A | 1/1997 | Wakabayashi et al. | 372/102 |
| 5,642,374 A | 6/1997 | Wakabayashi et al. | 372/57 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,748,316 A | 5/1998 | Wakabayashi et al. | 356/352 |
| 5,748,346 A | 5/1998 | David et al. | 359/15 |
| 5,754,571 A * | 5/1998 | Endoh et al. | 372/20 |
| 5,761,236 A | 6/1998 | Kleinschmidt et al. | 372/100 |
| 5,763,855 A | 6/1998 | Shioji | 219/121.84 |
| 5,764,678 A | 6/1998 | Tada | 372/57 |
| 5,771,094 A | 6/1998 | Carter et al. | 356/326 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A * | 11/1998 | Das et al. | 372/57 |
| 5,852,627 A | 12/1998 | Ershov | 372/108 |
| 5,856,991 A | 1/1999 | Ershov | 372/57 |
| 5,867,514 A | 2/1999 | Anderson | 372/38 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/57 |
| 5,949,806 A | 9/1999 | Ness et al. | 372/38 |
| 5,970,082 A | 10/1999 | Ershov | 372/102 |
| 5,978,391 A * | 11/1999 | Das et al. | 372/20 |
| 5,978,394 A | 11/1999 | Newman et al. | 372/32 |
| 5,978,406 A | 11/1999 | Rokni et al. | 372/58 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,028,880 A | 2/2000 | Carlesi et al. | 372/58 |
| 6,043,883 A | 3/2000 | Leckel et al. | 356/346 |
| 6,061,129 A | 5/2000 | Ershov et al. | 356/328 |
| 6,061,382 A | 5/2000 | Govorkov et al. | 372/101 |
| 6,078,599 A * | 6/2000 | Everage et al. | 372/20 |
| 6,081,542 A | 6/2000 | Scaggs | 372/70 |
| 6,094,448 A | 7/2000 | Fomenkov et al. | 372/102 |
| 6,128,323 A * | 10/2000 | Myers et al. | 372/38.1 |
| 6,151,346 A | 11/2000 | Partlo et al. | 372/38 |
| 6,154,470 A | 11/2000 | Basting et al. | 372/19 |
| 6,157,662 A | 12/2000 | Scaggs et al. | 372/60 |
| 6,160,825 A | 12/2000 | König | 372/20 |
| 6,160,831 A | 12/2000 | Kleinschmidt et al. | 372/57 |
| 6,160,832 A * | 12/2000 | Kleinschmidt et al. | 372/57 |
| 6,163,559 A | 12/2000 | Watson | 372/102 |
| 6,198,761 B1 | 3/2001 | von Bergmann et al. | 372/86 |
| 6,212,214 B1 | 4/2001 | Vogler et al. | 372/59 |
| 6,219,368 B1 | 4/2001 | Govorkov | 372/59 |
| 6,226,307 B1 | 5/2001 | Desor et al. | 372/37 |
| 6,240,110 B1 | 5/2001 | Ershov | 372/20 |
| 6,243,163 B1 | 6/2001 | Wakabayashi et al. | 356/326 |
| 6,243,170 B1 | 6/2001 | Ershov | 356/519 |
| 6,243,405 B1 | 6/2001 | Borneis et al. | 372/57 |
| 6,243,406 B1 | 6/2001 | Heist et al. | 372/59 |
| 6,269,110 B1 | 7/2001 | Leinhos et al. | 372/57 |
| 6,272,158 B1 * | 8/2001 | Kleinschmidt et al. | 372/32 |
| 6,282,215 B1 * | 8/2001 | Zorabedian et al. | 372/20 |
| 6,285,701 B1 | 9/2001 | Albrecht et al. | 372/57 |
| 6,529,531 B1 * | 3/2003 | Everage et al. | 372/20 |
| 2001/0013933 A1 | 8/2001 | Smith et al. | 356/454 |
| 2002/0003817 A1 * | 1/2002 | Lokai et al. | 372/20 |
| 2002/0012368 A1 * | 1/2002 | Kleinschmidt et al. | 372/32 |
| 2002/0154669 A1 * | 10/2002 | Spangler et al. | 372/55 |

OTHER PUBLICATIONS

J. Caplan, "Temperature and Pressure Effects on Pressure–Scanned Etalons and Gratings," *Applied Optics*, vol. 14, No. 7, Jul. 1975, pp. 1585–1591.

Masakatsu Okada et al., "Electronic Tuning of Dye Lasers by an Electro–optic Birefringent Fabry—Perot Etalon," *Optics Communications*, vol. 14, No. 1, pp. 4–7, 1975.

R.B. Green et al., "Galvanic Detection of Optical Absorptions in a Gas Discharge," *Applied Physics Letters*, vol. 29, No. 11, pp. 727–729, Dec. 1, 1976.

H. H. Barrett, et al., "Retroreflective arrays as approximate phase conjugators," *Opt. Lett. 4*. vol. 4, No. 6, 1979, pp. 190–192.

R.A. Keller et al., "Opto–galvanic Spectroscopy in a Hollow Cathode Discharge," *J. Opt. Soc. Am.*, vol. 69, No. 5, pp. 738–742, May 1979.

Richard A. Keller et al., Atlas for Optogalvanic Wavelength Calibration, *Applied Optics*, vol. 19, No. 6, pp. 836–837, Mar. 15, 1980.

N. Tan–No, et al., "Dispersion–free amplification and oscillation in phase–conjugate four–wave mixing in an atomic vapor doublet," *IEEE J. Quantum Electronics*, 16, 1980, pp. 147–153.

W. Demtröder, *Laser Spectroscopy*, published by Springer, Berlin 1981, Chapter 4: Spectroscopic Instrumentation, pp. 99–221.

M.D. Levenson, et al., "Projection photolithography by wave–front conjugation," *J. Opt. Soc. Am*, vol. 71, No. 6, Jun. 1981, pp. 737–743.

T.R. Hicks, "Tunable Fabry–Perot Filters," *Opt. Eng.*, vol. 20, No. 6 (1981) pp. 806–514.

Norman J. Dovichi, et al., "Use of the Optogalvanic Effect and the Uranium Atlas for Wavelength Calibration of Pulsed Lasers," *Applied Optics*, vol. 21, No. 8, pp. 1468–1473, Apr. 12, 1982.

D.L. Jordan, et al., "Experimental Measurements of Non-Gaussian Scattering by a Fractal Diffuser," *Applied Physics B.*, vol. 31, 1983, pp. 179–186.

P. Camus, "Atomic Spectroscopy with Optogalvanic Detection," *Journal De Physique*, (Paris) 11C7, pp. C7–87–106, Nov. 1983.

R. Martinez–Herrero, et al., "Transmitted Amplitude by a Fabry–Perot Interferometer with Random Surface Defects," *Applied Optics*, vol. 24, No. 3, Feb. 1, 1985, pp. 315–316.

D.P. Mahapatra, et al., "Exact Evaluation of the Transmittal Amplitude for a Fabry–Perot Interferometer with Surface Defects," *Applied Optics*, vol. 25, No. 10, May 26, 1986, pp. 1646–1649.

Andersson, M., et al., "Compressible Favry–Perot Refractometer," *Applied Optics*, vol. 26, No. 22, Nov. 15, 1987, pp. 4835–4840.

F. Babin et al., "Ultraviolet Optogalvanic Laser Spectroscopy of Iron for Reference Wavelengths," *Optics Letters*, vol. 12, No. 7, pp. 468–470, Jul. 1987.

D.R. Hall, et al., *The Physics and Technology of Laser Resonator*, 1989, pp. 1–20, 94–104, 117–131, 143–153, 176–189, 220–245.

R.S. Sandstrom, "Argon Fluoride Excimer Laser Source for Sub–0.25mm Optical Lithography," *Optical/Laser Microlithography IV*, vol. 1463, pp. 610–616, 1991.

R.K. Tyson, *Principles of Adaptive Optics, 2nd Edition*, 1991, Chapter 5: Wavefront Sensing, pp. 121–202.

Sansonetti, J.E., et al., "Atlas of the Spectrum of a Platinum/Neon Hollow–Cathode Reference Lamp in the Region 1130–4330 Å", *Journal of Research of the National Institute of Standards and Technology*, vol. 97, No. 1, Jan.–Feb. 1992, 1–211.

M. Kakehata, et al., "Output Characteristics of a Discharge–pumped Fe Laser (157nm) with an Injection–seeded Unstable Resonator," *J. Appl. Phys.*, vol. 74, No. 4, Aug. 15, 1993, pp. 2241–2246.

S. M. Hooker, et al., "Progress in Vacuum Ultraviolet Lasers," *Progress in Quantum Electronics*, vol. 18, 1994, pp. 227–274.

MacBride, et al., "Effect of Temperature Variation on FT–IR Spectomoter Stability," *Applied Spectroscopy*, 1997, vol. 51, No. 1, pp. 43–50.

Wakabayashi, et al., "Billion Level Durable ArF Excimer Laser with Highly Stable Ernergy," *SPIE 24th Annual International Symposium on Microlithography*, Santa Clara, Calif., May 14–19, 1999.

A. I. Ershov, et al., "Novel Metrology for Measuring Spectral Purity of KrF Lasers for Deep UV Lithography," *Proceedings of SPIE*, vol. 3677, Jun. 1999, pp. 611–620.

Sansonetti, et al., "Precision Measurement of Wavelengths Emitted by a Molecular Fluorine Laser at 157 nm," *Applied Optics*, vol. 40, No. 12, Apr. 20, 2001, pp. 1974–1978.

* cited by examiner

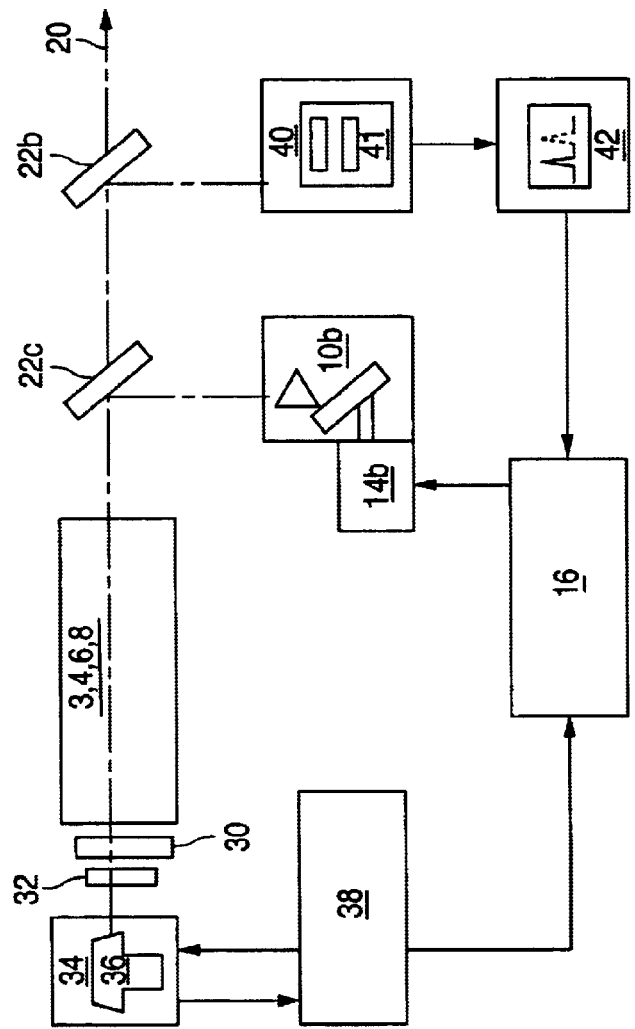

FIG. 2

Scheme of the laser system including the apparatus and processing for absolute wavelength calibration 3,4,6,8 laser chamber, pulser, gas handling, power supply
34 wavelength calibration tool containing absorbing element
38 signal processing and driving source for 2 gas cell
16 main processing and data recording
106 line narrowing and tuning block 14b motor drive for wavelength shift
40 wavelength monitoring
42 display for wavelength
22b,22c beam splitters
32 resonator mirror 20 narrow-band output beam
30 polarizer
36 gaseous element

| Wavelength Drifts | | | | | | | | | | | | |
|---|---|---|---|---|---|---|---|---|---|---|---|---|
| Pre | 6464 | 6462 | 6459 | 6480 | 6461 | 6457 | 6458 | 6094 | 6102 | 6105 | 6104 | |
| Start | -0.02 | -0.01 | -0.01 | 0.01 | 0 | -0.01 | -0.03 | -0.05 | 0.05 | -0.01 | 0.01 | |
| Full1 | 0.03 | -0.02 | -0.11 | -0.01 | -0.05 | -0.02 | -0.09 | -0.07 | 0 | 0.03 | 0 | |
| Full2 | 0 | -0.07 | -0.06 | -0.04 | -0.1 | -0.03 | -0.12 | -0.13 | -0.01 | -0.06 | -0.9 | |
| Full3 | 0.01 | -0.02 | 0 | 0 | -0.04 | -0.02 | -0.14 | -0.13 | -0.03 | -0.01 | -0.1 | |
| Full4 | 0 | -0.07 | -0.05 | -0.02 | -0.1 | -0.02 | -0.18 | -0.17 | -0.05 | 0 | -0.16 | |
| Final | 0.01 | -0.06 | 0.03 | -0.07 | -0.16 | 0.09 | -0.18 | -0.13 | -0.12 | 0 | -0.17 | |
| Post | -0.1 | -0.01 | 0.01 | -0.14 | -0.2 | 0.08 | -0.17 | -0.22 | -0.2 | -0.07 | -0.23 | |
| | -0.04 | 0.05 | 0.07 | -0.08 | -0.25 | 0.12 | -0.18 | -0.21 | -0.19 | 0.08 | -0.23 | |
| Diff: | | | | | | | | | | | | |
| | -0.03 | -0.05 | 0.03 | -0.83 | -0.05 | -0.01 | -0.03 | -0.06 | -0.01 | -0.09 | -0.09 | |
| | 0.01 | -0.05 | 0.08 | 0.04 | 0.06 | 0.01 | -0.02 | 0 | -0.02 | 0.05 | -0.01 | |
| | -0.01 | -0.05 | -0.05 | -0.02 | -0.06 | 0 | -0.04 | -0.04 | -0.02 | 0.02 | -0.08 | |
| | 0.01 | 0.13 | 0.08 | -0.06 | -0.06 | 0.11 | 0.1 | -0.04 | -0.07 | 0 | -0.01 | |
| | -0.11 | -0.07 | -0.02 | -0.07 | -0.04 | -0.01 | -0.09 | -0.09 | -0.08 | -0.07 | -0.06 | |
| | | 0.01 | 0.12 | -0.13 | -0.15 | 0.1 | -0.08 | -0.15 | -0.2 | -0.1 | | |
| Diff GLD: | -0.13 | | | | | | | | | | -0.23 | |
| Good tendency | | | | x | x | | x | x | x | | x | |

FIG. 7

PRECISE MONITOR ETALON CALIBRATION TECHNIQUE

PRIORITY

This application claim the benefit of priority to U.S. patent application Ser. No. 60/218,417, filed Jul. 14, 2000.

BACKGROUND OF THE INVENTION

1. Field of the Invention

The invention relates to relative wavelength calibration for excimer and molecular fluorine lasers, and particularly to a technique for using an expert computer system for compensating spectral drift of a wavelength measurement system, such as may include the use of a monitor etalon or grating spectrometer.

2. Discussion of the Related Art

Excimer lasers emitting pulsed UV-radiation are becoming increasingly important instruments in specialized material processing. The KrF-excimer laser emitting around 248 nm and the ArF-excimer laser emitting around 193 nm are currently the light sources of choice for photolithographic processing of integrated circuit devices (IC's). The F2-laser is also being developed for such usage and emits light around 157 nm.

It is recognized herein that it is desired in the field of industrial silicon processing that each of the above laser systems become capable of emitting a narrow spectral band around a very precisely determined and finely adjustable wavelength. It is further recognized that it is desired to have techniques for reducing bandwidths by special resonator designs to less than 100 pm for semi-narrow band lasers, to less than 1 pm for narrow band lasers, and to less than 0.6 pm for very narrow band lasers. It is further recognized that it is desired to have techniques for tuning and controlling central wavelengths of emission.

In order to tune the line-narrowed output of an excimer or molecular fluorine laser system precisely to a desired wavelength, a portion of the laser beam may be directed through a wavelength measurement system (WMS), such as may include the use of an etalon spectrometer (hereinafter referred to as a monitor etalon) or a grating spectrometer. The WMS may be calibrated to an absolute wavelength reference such as by directing a portion of the laser beam to an opto-galvanic cell, absorption lamp, or by comparison with a reference laser line or lamp line. Then, with the dispersion of the WMS being known, or alternatively the free spectral range of the monitor etalon being known, an optics control module tunes the optics of the laser resonator to adjust the wavelength to a desired value.

It is recognized in the present invention that the wavelength measurement system tends to drift over time from its calibration point. That is, the measured wavelength determined from the interference pattern captured on an array detector associated with the monitor etalon, or spectrally dispersed distribution detected at the array detector due to dispersion from a grating or prism, when the beam traverses the interference or dispersive optics of the WMS fluctuates from the true wavelength of the beam as the laser operates after a calibration of the WMS to the reference line.

This drift is most notably due to the effects of the DUV or VUV laser beam striking a surface or surfaces of the interference or dispersion optics of the WMS, such as the plates of the etalon or the surface of the grating or surfaces of a dispersive prism, etc. Among these effects, the gap spacing may vary as the etalon plates are heated due to absorption of some of the incident beam. Localized heating of the grating or prism surface can cause topographic distortions. Also, moisture may come out of the etalon, prism or grating surface when it heats up. Moreover, coating layer compaction may occur on the inner surfaces of the etalon, or on surfaces of the grating or prism, if used.

There may be geometric factors causing the measured wavelengths obtained using the WMS to drift away from the true values. Among these, the orientations of optics such as the angle of tilt of the etalon may change systematically with time of laser operation relative to the surface of the array detector and/or incoming beam. The projection focus of the spectral distribution or pattern, produced by the interference of the beam at the etalon or dispersion at the grating or prism, onto the array detector may also vary with time of laser operation.

When a monitor etalon is used as a WMS, the etalon may be re-calibrated periodically, using the reference line as mentioned above, to prevent the amount of drift from approaching an intolerable amount. However, these multiple re-calibration procedures are laborious and time-consuming, and would be typically performed when the laser is undesirably taken down or offline. It is desired to have a technique for compensating optical drift of the monitor etalon that avoids laser system downtime.

Moreover, the optical drift of the monitor etalon, as well as other optical, thermal and electronic phenomena, conventionally produces increasing uncertainty and imprecision at times following the initial calibration or re-calibration procedure. It is desired to have a method of compensating optical drift of the monitor etalon or other optics of a wavelength measurement system such that the output beam of the laser system is reliably spectrally located at the desired wavelength after long or short periods of laser operation following an initial absolute wavelength calibration procedure.

SUMMARY OF THE INVENTION

It is therefore an object of the invention to provide a technique for compensating optical drift of the monitor etalon or dispersive optic of a wavelength measurement system (WMS) that avoids laser system downtime.

It is another object of the invention to provide a technique, wherein a WMS can be reliably used to precisely maintain an output beam of a laser system at a desired wavelength over short or long laser operation periods, such that even after extended periods of laser operation following an initial absolute wavelength calibration procedure, the wavelength may be measured with reliability, wherein when a monitor etalon is conventionally used, the etalon would typically drift an intolerable amount over that extended period due to beam exposure.

In accordance with the above objects, a method for compensating optical drift of a wavelength measurement system used for relative wavelength tuning of an output beam of an excimer or molecular fluorine laser system is provided including operating the laser system including generating a laser beam and directing a beam portion through the wavelength measurement system, calibrating the wavelength measurement system to an absolute reference, tuning the output beam to a target wavelength using the wavelength measurement system, detecting a measured wavelength of the output beam using the wavelength measurement system after a predetermined period of laser operation, calculating a compensated wavelength by figuring in a previously determined drift compensation value; and adjusting the wavelength of the laser beam to the target wavelength when the compensated wavelength differs from the target wavelength. The method may further include repeating detecting calculating and adjusting steps a number times after additional periods of laser operation.

A method for operating an excimer or molecular fluorine laser system at a stabilized wavelength, the laser system including a wavelength measurement system for relative wavelength tuning, including operating the laser system including generating a laser beam and directing a beam portion through the wavelength measurement system, calibrating the wavelength measurement system to an absolute reference, determining the wavelength of the laser beam, and tuning the wavelength to a target wavelength when the determined wavelength differs from the target wavelength. The wavelength determining step includes transmitting wavelength information measured by the wavelength measurement system, retrieving a drift compensation value stored as corresponding to a current laser system operating condition, and calculating the wavelength of the laser beam based on the transmitted wavelength information and the retrieved drift compensation value. The method may further include repeating the determining and tuning steps a number times after additional periods of laser operation.

A method for preparing an excimer or molecular fluorine laser system to operate at a stabilized wavelength by compensating optical drift of a wavelength measurement system used for relative wavelength tuning of an output beam of the excimer or molecular fluorine laser system is also provided including operating the laser system including generating a laser beam and directing a beam portion through the wavelength measurement system, calibrating the wavelength measurement system to an absolute reference, determining a value of the wavelength of the laser beam measured by the wavelength measurement system after a predetermined period of laser operation, comparing the value of the wavelength measured by the wavelength measurement system after the predetermined period of laser operation with an actual value of the wavelength of the laser beam and determining a drift compensation value based on a result of the comparing step. The method may further include repeating the wavelength value determining step, the comparing step and the drift compensation value determining step after additional periods of laser operation, and storing the drift compensation values versus laser operation period of the wavelength measurement system for use with a wavelength stabilization routine of the laser system.

A method for preparing an excimer or molecular fluorine laser system to operate at a stabilized wavelength by compensating optical drift of a wavelength measurement system used for relative wavelength tuning of an output beam of the excimer or molecular fluorine laser system is further provided including operating the laser system including generating a laser beam at a target wavelength by orienting a tuning optic of the laser system at a first position and directing a beam portion through the wavelength measurement system, calibrating the wavelength measurement system to an absolute reference, orienting the tuning optic to a second position such that the wavelength of the laser beam measured by the wavelength measurement system after a predetermined period of laser operation is at the target value, comparing the first position with the second position of the tuning optic, and determining a drift compensation value based on a result of the comparing step. The method may further include repeating the orienting, comparing and determining steps a number times after additional periods of laser operation and storing the drift compensation values versus laser operation period for use with a wavelength stabilization routine of the laser system.

BRIEF DESCRIPTION OF THE DRAWINGS

FIG. 2 schematically shows an excimer or molecular fluorine laser system in accord with the preferred embodiment and arranged to measure the drift with laser operation of a monitor etalon.

FIG. 7 shows an illustrative table of drift amounts with time of a monitor etalon wavelength measurement system determined in accord with a preferred embodiment.

INCORPORATION BY REFERENCE

Figure 1:
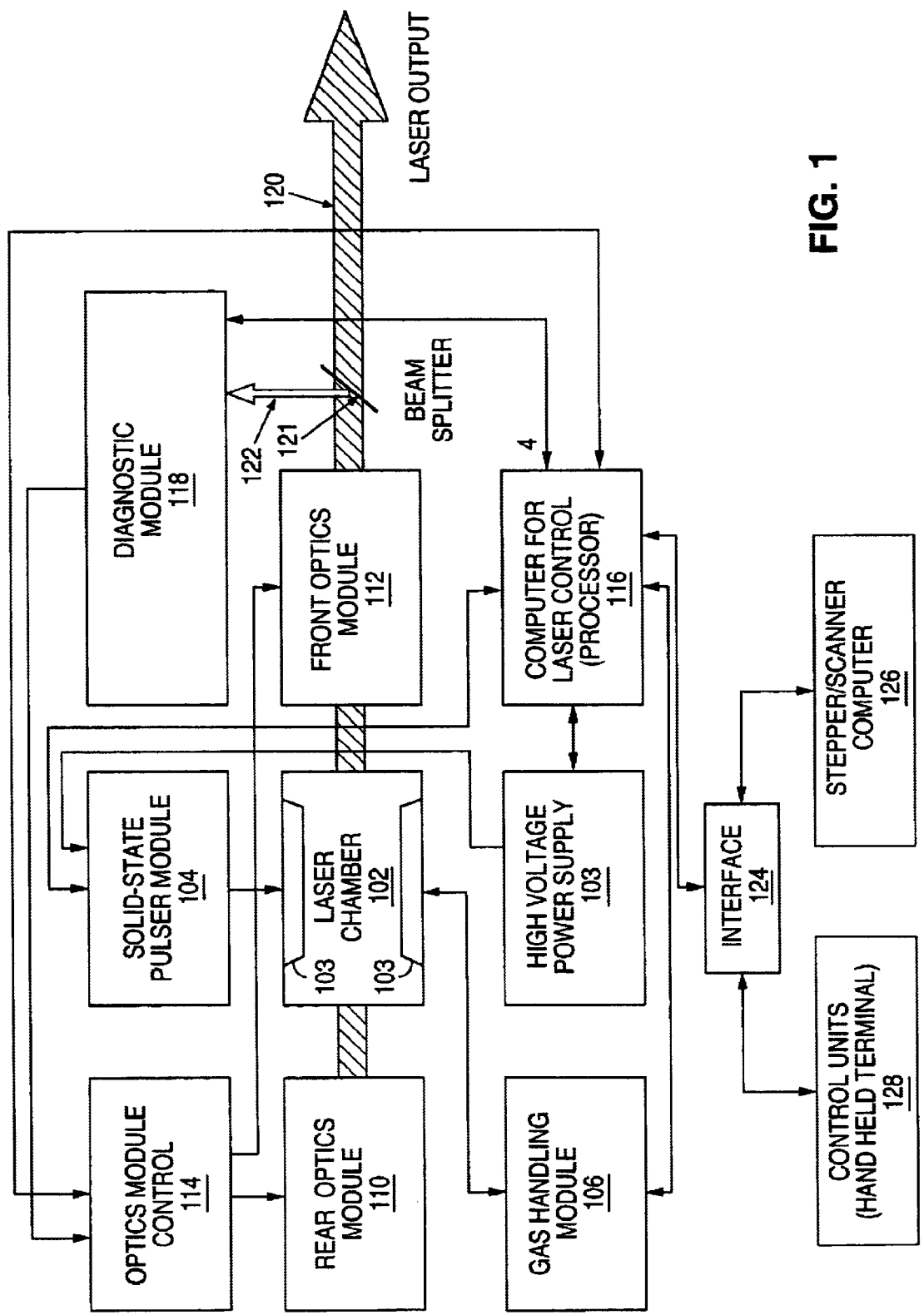
FIG. 1 schematically shows an excimer or molecular fluorine laser system in accord with the preferred embodiment.

What follows is a cite list of references which are, in addition to any references cited above in the background section or below in the detailed description of the preferred embodiments, and the background section itself, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

R. B. Green et al., "Galvanic Detection of Optical Absorptions in a Gas Discharge," Applied Physics Letters, Vol. 29, No. 11, pp.727–729, Dec. 1, 1976;

R. Sandstrom, "Argon Fluoride Excimer Laser Source for Sub-0.25 mm Optical Lithography," Optical/Laser Microlithography IV, Vol. 1463, pp.610–616, 1991;

F. Babin et al., "Ultraviolet Optogalvanic Laser Spectroscopy of Iron for Reference Wavelengths," Optics Letters, Vol. 12, No. 7, pp. 468–470, July 1987;

P. Camus, "Atomic Spectroscopy with Optogalvanic Detection, Journal De Physique, (Paris) 11C7, pp. C7-87–106, November 1983;

Richard A. Keller et al., "Atlas for opto-galvanic wavelength calibration," Applied Optics, Vol. 19, No. 6, pp. 836–837, Mar. 15, 1980;

R. A. Keller et al., "Optogalvanic spectroscopy in a uranium hollow cathode discharge," J. Opt. Soc. Am., Vol. 69, No. 5, pp. 738–742, May 1979;

Norman J. Dovichi, et al., "Use of the optogalvanic effect and the uranium atlas for wavelength calibration of pulsed lasers," Applied Optics, Vol. 21, No. 8, pp. 1468–1473, Apr. 15, 1982;

Masakatsu Okada et al., "Electronic Tuning of Dye Lasers by an Electrolytic Birefringent Fabry-Perot Etalon," Optics Communications, Vol. 14, No. 1, pp. 4–7, 1975; and U.S. patent applications Ser. Nos. 09/416,344, 09/686,483, 09/715,803, 09/741,465, 09/734,459, 09/791,431, 60/242,602, 60/212,301, and 09/791,496; and U.S. Pat. Nos. 4,926,428, 5,978,394, 5,450,207, 4,905,243, 5,978,391, 4,823,354, 4,319,843, 4,911,778, 4,914,662, 5,142,543, 5,198,872, 5,218,421, 5,404,366, 5,764,678, 5,771,094, 6,160,831, 6,160,832, 5,373,515 and 5,025,445.

DETAILED DESCRIPTION OF THE PREFERRED EMBODIMENTS

Techniques are provided herein for compensating optical drift of a WMS such as uses a monitor etalon or grating or prism spectrometer for relative wavelength tuning of an output beam of an excimer or molecular fluorine laser system. The method includes tuning the output beam to a known wavelength after calibration of the WMS to an absolute wavelength reference. Then, the laser is operated for a period, preferably an extended period, at the desired wavelength, and the amount of drift is measured periodically during that period.

The amount of drift of the WMS at the time of each measurement, relative to the initial zero drift when the WMS is calibrated using the absolute reference line is stored in a memory accessible by an expert computer system or otherwise programmed into software of the expert system. Then, when the WMS is being used during laser operation to set and/or maintain a laser output beam at a desired wavelength, the expert computer system calculates the wavelength of the output beam by adding an offset amount, based on a stored drift amount corresponding to the extent of the period or duration and/or the number of emitted laser pulses since the WMS was initially calibrated, to the wavelength measured, calculated and/or determined from the output of the WMS. In this way, the optical drift of the WMS is compensated without incurring laser downtime, even though the drift of the WMS may be otherwise greater than an allowed tolerance of error in the wavelength determination.

Preferably, the drift is measured by a calibration procedure using a reference line (e.g., hollow-cathode lamp, reference laser, reference lamp, etc.). The calibration procedure is performed often enough that the WMS is not allowed to drift too much over that interval. Then, the offset values are recorded and used during laser operation for application processing. The measured drift amounts and offsets calculated allow offset predictions over long laser operation periods, and after correction with the offset, the wavelength accuracy can be improved over these long periods, and can be checked to ensure the offsets are accurate. The drift amounts of the WMS, e.g., with time and/or pulse count, may alternatively be determined by using a second WMS such as a second monitor etalon or grating or prism spectrometer that is re-calibrated periodically, such that the drift amounts of the first monitor etalon are calculated as the difference between the wavelengths measured by the first and second monitor etalons. Also, another spectrometer such as a grating spectrometer may be used for calculating the drift of the first monitor etalon over time, and other combinations may be used.

The drift amounts may be tabulated with each entry corresponding to a different amount of laser operation time, or pulse count or other parameter indicated of laser operation amount, after the initial absolute calibration of the WMS. Also, a function may be generated corresponding to the continuous amount of drift of the WMS with time of laser operation. The drift amounts may be measured and tabulated, or a function may be generated, for different laser operation parameters such as repetition rate, burst rate, output power, optical arrangement, discharge conditions, gas mixture compositions and ages, ages of the laser tube and/or resonator optics, and many other variable laser system parameters known to those skilled in the art.

Overall Laser System

FIG. 1 schematically illustrates an overall excimier or molecular fluorine laser system according to a preferred embodiment which preferably also includes the advantageous features described above and those described below with reference to FIGS. 2 and 3. Referring to FIG. 1, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 1 to meet the requirements of that application. For this purpose, alternative DUV or VUV laser system and component configurations are described at U.S. patent applications Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 1 generally includes a laser chamber 102 (or laser tube including a heat exchanger and fan for circulating a gas mixture within the chamber 102 or tube) having a pair of main discharge electrodes 103 and at least one (and preferably two) preionization unit connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent applications Ser. Nos. 09/513,025, 09/780,120, 09/734,459 and 09/447,882, which is assigned to the same assignee as the present application, and U.S. Pat. Nos. 4,977,573 and 6,157,662, which are each hereby incorporated by reference). The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

Processor Control

The processor 116 for laser control receives various inputs and controls various operating parameters of the system. A diagnostic module 118 receives and measures one or more parameters, such as pulse energy, average energy and/or power, and preferably wavelength and bandwidth, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity to a desired wavlength and/or bandwidth based on spectral information received from a wavelength measurement system (WMS), described in more detail below, and controls the power supply and pulser module 104 and 108 to control preferably the moving average pulse power or energy such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 1, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

Solid State Pulser Module

The laser chamber 102 contains a laser gas mixture and includes one or more preionization electrodes (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent applications Ser. No. 09/692,265 (particularly preferred for KrF, ArF, $F_2$ lasers), Ser. Nos. 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply may be described at U.S. patent applications Ser. Nos. 09/640,595, 60/198,058, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Laser Resonator

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715,803 application, wherein the same optic or optics or an additional line-narrowing optic or optics for narrowing the selected line may be used. Also particularly, for the $F_2$-laser and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 60/212,301, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

Diagnostic Module

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent applications Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam of a molecular fluorine laser prior to detection.

The output beam 120 may be transmitted at the beam splitter module 121 while a reflected beam portion 122 is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent applications Ser. No. 09/172,805, 09/741,465, 09/712,877, 09/771,013 and 09/771,366, each of which is assigned to the same assignee as the present application and is hereby incorporated by reference).

One other component of the diagnostic module 118 is a wavelength and/or bandwidth detection component or otherwise referred to herein as a wavelength measurement system (WMS) such as a monitor etalon or grating spectrometer (see U.S. patent applications Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748, 346, 5,025,445, 6,160,832, 6,160,831 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. In addition, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference. There may also preferably include one or more detectors for monitoring beam profile, beam divergence and/or beam coherence.

Beam Path Enclosure

Particularly for the molecular fluorine laser system, and for the ArF laser system, an enclosure (not shown) preferably seals the beam path of the beam 120 such as to keep the beam path free of photoabsorbing species. Smaller enclosures preferably seal the beam path between the chamber 102 and the optics modules 110 and 112 and between the beam splitter 122 and the diagnostic module 118. The optics modules 110 and 112 are maintained in an atmosphere that is sufficiently evacuated or have an inert gas purged atmosphere. Preferred enclosures are described in detail in U.S. patent applications Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221, 823, 5,763,855, 5,811,753 and 4,616,908, all of which are hereby incorporated by reference.

Gas Mixture

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent applications Ser. Nos. 09/513, 025, 09/447,882, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 30–300 milliliters of buffer gas, or a premix of, e.g., between 1% and 10% $F_2$ in He and/or Ne buffer gas wherein 1% premix is preferred for lithographic applications, or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214, 6,243,406 and 5,396,514 and U.S. patent applications Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or 0.5 pm or less). These exemplary embodiments may be used for a molecular fluorine laser, e.g., selecting the primary line $\lambda_1$ only, or may be used to provide additional line narrowing as well as performing line-selection, or the resonator may include optics for line-selection and additional optics for line-narrowing of the selected line of the molecular fluorine laser, and line-narrowing may be provided by controlling (i.e., reducing) the total pressure (see U.S. patent application Ser. No. 60/212,301, which is assigned to the same assignee and is hereby incorporated by reference).

Exemplary line-narrowing optics contained in the optics module 110 include a beam expander, an optional interferometric device such as an etalon or a device having a pair of opposed non-planar reflection plates such as may be described in the Ser. Nos. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the linenarrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as µHls as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at wavelengths below 200 nm, such as at the 157 nm output emission wavelength of the molecular fluorine laser or the 193 nm emission of the ArF laser. The materials are also capable of withstanding long-term exposure to ultraviolet light with minimal degradation effects. Examples of such materials are $CaF_2$, $MgF_2$, $BaF_2$, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime. Some other materials are available such as fused silica for use with the KrF laser which emits a beam at around 248 nm.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent applications Ser. No. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

Wavemeter Calibration

FIG. 2 schematically shows a second embodiment of a laser system in accord with the present invention specifically showing a monitor etalon module for relative wavelength detection and stabilization. The laser system includes a laser chamber 3, pulser module 4, gas handling module 6 and power supply 8, preferably as described above with respect to FIG. 1. On one side of the chamber 3 is an optional polarizer 30 and resonator mirror 32. An optogalvanic or photoabsorption cell, or gas cell 34, preferably filled with a gaseous photoabsorbing species 36, such as iron, platinum, germanium, bromine, silicon, selenium and/or another species that absorbs around an emission wavelength of the laser, is shown after the resonator reflector 32. The resonator reflector 32 is preferably highly reflective, but allows a small portion of the beam to transmit through to the cell 34. For preferred gas cell embodiments, see the U.S. Pat. Nos. 6,160,832 patent, mentioned above, and U.S. patent application Ser. No. 09/791,431, which is assigned to the same assignee as the present application, and U.S. Pat. Nos. 5,978,391 and 5,978,394, all of which are hereby incorporated by reference. A signal processing and driving source 38 for the gas cell is also shown connected between the gas cell 34 and the processor 16.

On the other side of the laser chamber 3, a beam splitter 22c is shown directing the beam to a line-narrowing module 10b which is controlled by an optics control motor drive module 14b for controlling the orientation or other parameter such as gas pressure or internal geometry of the optics, and ultimately the wavelength and/or bandwidth of the beam. The line-narrowing module 10b includes a component that serves as one of the resonator mirrors. The processor 16 maintains central control over the motor drive module 14b.

A portion of the beam is directed to a wavelength/bandwidth detection module 40, or wavelength measurement system (WMS), again preferably using a beamsplitter 22b. The module preferably includes a monitor etalon 41 such as is described at U.S. patent application Se. No. 09/416,344 and U.S. Pat. No. 4,905,243, each of which is assigned to the same assignee as the present application, and U.S. Pat. Nos. 5,450,207, 4,926,428, 5,748,346, 5,025,445, all of which are hereby incorporated by reference. An image or array detector receives an interference pattern of the light incident at the etalon, and the light is either preferably transmitted through or reflected from the etalon. The module 40 may alternatively or additionally comprise a grating or grating spectrometer (not shown).

From the interference pattern detected, the wavelength and/or bandwidth is determined, and if the wavelength and/or bandwidth is different from a target value, then the processor signals the optics control module 14b to adjust the wavelength and/or bandwidth to the target value. The wavelength and/or bandwidth detection module 40 monitors the wavelength and/or bandwidth, and sends the wavelength and/or bandwidth information to the processor 16 and/or directly to the optics control module 14b. The wavelength and/or bandwidth may be adjusted in a feedback arrangement based on the information the processor 16 and/or optics control module 14b receives from the monitor etalon module 40 and array detector 42 based on its programming and the desired wavelength and/or bandwidth for the particular industrial application being performed.

As briefly described above, and as discussed in the '832, '831, '243, '207 and '428 patents, U.S. patent application Ser. No. 09/791,431, which is assigned to the same assignee as the present application, and U.S. Pat. No. 5,373,515, each of which is hereby incorporated by reference into the present application, the monitor etalon is calibrated to an absolute reference when the laser beam is initially tuned to an absorption or optical transition line of a species in a photoabsorption or opto-galvanic cell, or to an optical emission line, e.g., of a reference laser. The laser beam is tuned away from the reference line using the monitor etalon 41, and observing the evolution of the interference pattern measured at the detector 42 as the laser is tuned.

The problem exists as set forth above, that wavelength values determined for the laser beam using the monitor etalon 41 tend to "drift" away from the actual wavelength of the beam, resulting in the beam being at a wavelength that is somewhat different from the target wavelength. When this drift becomes too large to be tolerated, then the monitor etalon is conventionally recalibrated using the reference line, often resulting in additional downtime.

In the system of the preferred embodiment, the processor has a set of stored offset values that are added to values determined using the monitor etalon over a long laser operation period. The long laser operation period is longer than a period that would produce intolerable wavelength error due to drift if the conventional technique were used. The preferred system herein allows the laser to be operated over the long laser operation period, while the wavelength is maintained within tolerance because of the offset compensation performed by the processor as wavelength values are received from the detector 42 during system operation.

Different offset compensation values are used by the processor depending on the duration of laser operation since calibration of the etalon 41 to the reference line. The duration or period of operation may be measured in time, pulse count, input energy to the discharge, total output energy or another laser parameter that gradually increases as the laser is operated.

Preferably, one or more test runs are performed wherein the drift of the etalon is measured over an extended period of laser operation. Also, preferably, test runs are performed for many or all operation conditions that the laser may be run under in the fab. In this way, the appropriate set of offsets may be called up by the processor depending on the operation condition of the laser system. The determined offsets may be corrected at each calibration of multiple calibrations depending on the measured deviation and the deviation from the last calibration.

The drift may be measured by a calibration procedure using a reference line (e.g., hollow-cathode lamp, reference laser, reference lamp, etc.). The calibration procedure is performed often enough that the WMS is not allowed to drift too much over that interval. Then, the offset values are recorded and used during laser operation for application processing. The measured drift amounts and offsets calculated allow offset predictions over long laser operation periods, and after correction with the offset, the wavelength accuracy can be improved over these long periods, and can be checked to ensure the offsets are accurate.

Each test run may alternatively be performed using a second spectrometer that is calibrated to an absolute line over the entire period of the test run. Alternatively, back-to-back test runs may be performed with the same laser, wherein the first test run is performed with, e.g., the second spectrometer and the second test run is performed using the monitor etalon 41 for which offset values are desired in accord with the preferred embodiment. The difference between the wavelength values determined using the monitor etalon 41 that is only initially calibrated to the reference line and those using the second spectrometer that is maintained in a calibrated state are then used as the offset compensation values. The offset values may be added to or subtracted from the measured wavelengths using the etalon 41 depending on the results of the test runs.

Figure 3:
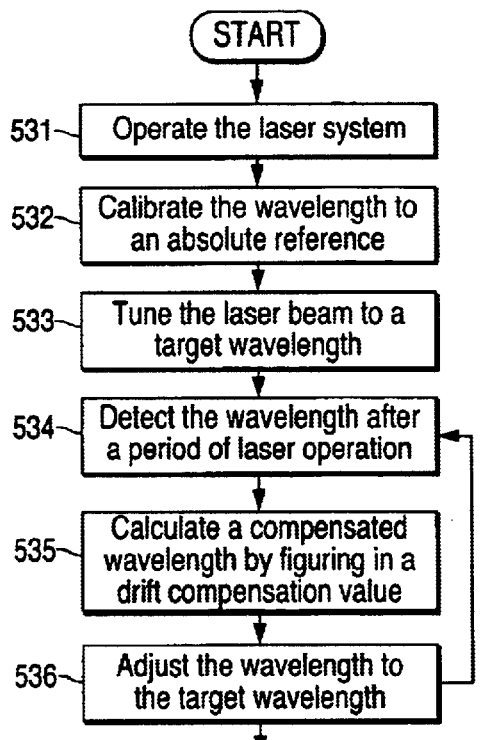
FIG. 3 is a flow diagram of operations for a method of operating an excimer or molecular fluorine laser system at a stabilized wavelength according to a preferred embodiment.

FIG. 3 is a flow diagram of operations for a method of operating an excimer or molecular fluorine laser system at a stabilized wavelength according to a preferred embodiment. The method begins at step S31 by operating an excimer or molecular fluorine laser system such as that shown and described with reference to FIGS. 1–2 herein. The wavelength measured by a wavelength measurement system (WMS), such as a monitor etalon or grating spectrometer of the laser system, is calibrated to an absolute reference, such as using a hollow cathode lamp or reference laser beam, as described above, at step S32 as shown in FIG. 3. At step S33, the wavelength measurement system is used to adjust one or more tuning optics of the laser system so that the laser outputs a beam at a target wavelength.

After the laser is operated for a period of time, pulse count, input energy to the discharge, or other countable parameter, the wavelength is again detected using the WMS at step S34. The actual wavelength of the beam is determined by calculation at step S35, such as by adding or subtracting a drift compensation value previously determined for the period of operation of the laser and preferably other operating conditions of the laser system such as repetition, burst rate, output power, optical arrangement, discharge conditions, gas mixture conditions and/or composition, gas mixture age, age of laser chamber and/or age of resonator optics, among potentially others as may be understood by those skilled in the art. The WMS is again used at step S36 to adjust the one or more tuning optics of the laser resonator so that the beam is adjusted again to the target wavelength.

Steps S34 through S36 may be repeated periodically after additional laser operating periods to maintain the output wavelength of the laser at the target wavelength for an extended period of time. At some point, the WMS may be re-calibrated to the absolute reference, e.g., during a scheduled system downtime, such as by returning to step S32, rather than step S34, and continuing with the process by steps S33 through S36. Advantageously, however, the re-calibration process may be performed less often than if the laser system were operated without using the drift compensation method including step S35 of this preferred laser system operating method, resulting in reduced laser system downtime, and, e.g., greater wafer throughput if the system is used in a photolithographic or other silicon processing application.

Figure 4:
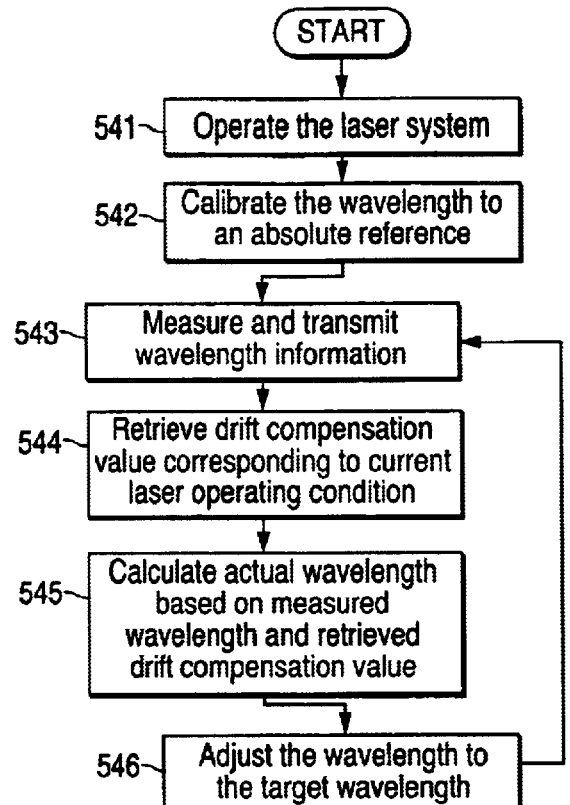
FIG. 4 is a flow diagram of operations for another method of operating an excimer or molecular fluorine laser system at a stabilized wavelength according to a preferred embodiment.

FIG. 4 is a flow diagram of operations for another method of operating an excimer or molecular fluorine laser system at a stabilized wavelength according to a preferred embodiment. The method begins at step S31 by operating an excimer or molecular fluorine laser system such as that shown and described with reference to FIGS. 1–2 herein. The wavelength measured by a wavelength measurement system (WMS), such as a monitor etalon or grating spectrometer of the laser system, is calibrated to an absolute reference, such as using a hollow cathode lamp or reference laser beam, as described above, at step S32 as shown in FIG. 4. At steps S43 through S45, the wavelength of the laser beam is determined.

In determining the laser wavelength according to the preferred embodiment illustrated at FIG. 4, the wavelength is measured using the WMS and preferably transmitted for use by a processor such as that described above with reference to FIG. 1. A drift compensation value is retrieved at step S44 corresponding to current laser operating conditions and the period of operation after which the wavelength is measured in step S43. An actual wavelength value of the output beam of the laser system is calculated at step S45, such as, e.g., by adding or subtracting the wavelength compensation value retrieved at step S44 with the wavelength measured at step S43. If the calculated wavelength is determined to deviate from a target wavelength, then one or more tuning optics of the laser resonator are adjusted at step S46 so that the beam again has a central wavelength at approximately the target wavelength.

Steps S43 through S46 may be repeated periodically after additional laser operating periods to maintain the output wavelength of the laser at the target wavelength for an extended period of time. At some point, the WMS may be re-calibrated to the absolute reference, e.g., during a scheduled system downtime, by returning to step S42, rather than step S43, and continuing from there by steps S43 through S46. Advantageously, however, the re-calibration process may be performed less often than if the laser system were operated without using the drift compensation method including steps S44 and S45 of this preferred laser system operating method, resulting in reduced laser system downtime, and, e.g., greater wafer throughput if the system is used in a photolithographic or other silicon processing application.

Figure 5:
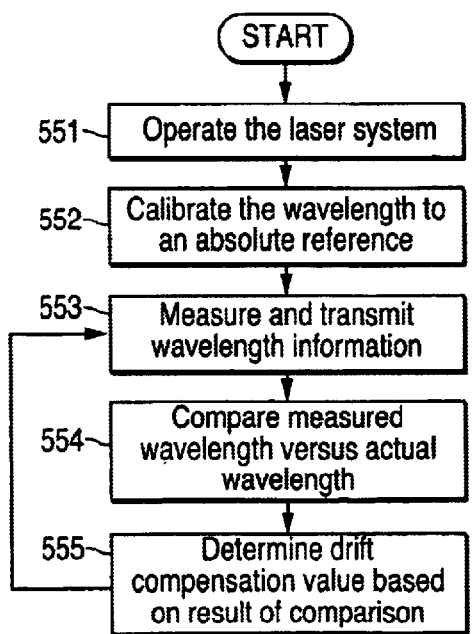
FIG. 5 is a flow diagram of operations for a method of determining a wavelength drift compensation value for a wavelength stabilization system of an excimer or molecular fluorine laser system according to a preferred embodiment.

FIG. 5 is a flow diagram of operations for a method of determining a wavelength drift compensation value for a wavelength stabilization system of an excimer or molecular fluorine laser system according to a preferred embodiment. The method begins at step S51 by operating an excimer or molecular fluorine laser system such as that shown and described with reference to FIGS. 1–2 herein. The wavelength measured by a wavelength measurement system (WMS), such as a monitor etalon or grating spectrometer of the laser system, is calibrated to an absolute reference, such as using a hollow cathode lamp or reference laser beam, as described above, at step S52 as shown in FIG. 5.

The laser may be tuned to a wavelength corresponding to a reference line of the absolute calibration apparatus or to another wavelength such as a target operating wavelength, e.g., that is typically used for lithographic processing or another selected wavelength. The method of FIG. 5 may be performed for several wavelength that may be later used for applications processing. After a period of laser operation, the wavelength is measured at step S53 and preferably transmitted for use by a processor such at that described above with reference to FIG. 1. The measured wavelength is compared with the actual wavelength at step S34. The actual wavelength may be determined by using a WMS that has just been calibrated to the absolute reference, or by using the absolute reference itself which may be the same of different than that used at step S52, or otherwise as may be understood by those skilled in the art. A drift compensation value for the period of operation between steps S52 and S53 and current laser operating conditions is determined at step S55.

The process of FIG. 5 may be performed for several laser operating conditions and period of laser operation. For example, after another period of laser operation, the method may return to step S53 for determining another drift compensation value for another laser operating period. The method may return to step S51 or S52 at some point to operate the laser at one or more different operating conditions such as repetition rate, burst rate, output power, optical arrangement, discharge conditions, gas mixture condition or composition, gas mixture age, age of laser chamber, age of resonator optics, or other conditions as may be understood by those skilled in the art. The drift compensation values are preferably stored for many laser operating periods and conditions, so that the values may be used, e.g., in performing a process such as those described above with reference to FIGS. 3 and 4.

Figure 6:
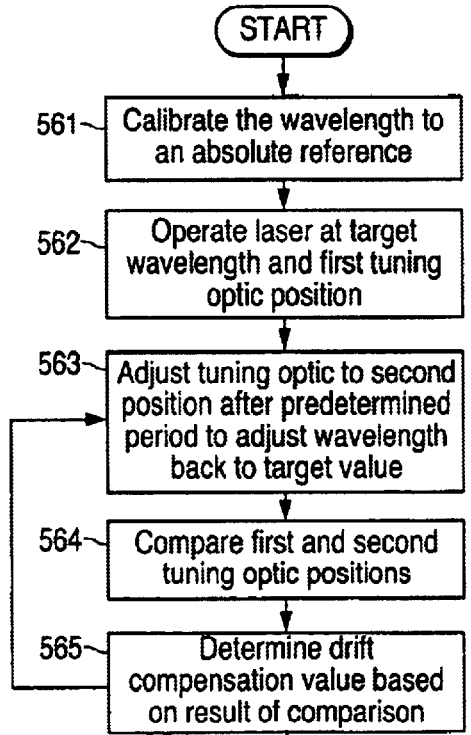
FIG. 6 is a flow diagram of operations for another method of determining a wavelength drift compensation value for a wavelength stabilization system of an excimer or molecular fluorine laser system according to a preferred embodiment.

FIG. 6 is a flow diagram of operations for another method of determining a wavelength drift compensation value for a wavelength stabilization system of an excimer or molecular fluorine laser system according to a preferred embodiment. The method begins at step S61 by operating an excimer or molecular fluorine laser system such as that shown and described with reference to FIGS. 1–2 herein. The wavelength measured by a wavelength measurement system (WMS), such as a monitor etalon or grating spectrometer of the laser system, is calibrated to an absolute reference, such as using a hollow cathode lamp or reference laser beam, as described above, at step S62 as shown in FIG. 6. The position or positions of one of more tuning optics of the laser resonator preferably is/are noted at step S62. This position or these positions are referred to here at the "first" position.

The laser may be tuned to a wavelength corresponding to a reference line of the absolute calibration apparatus or to another wavelength such as a target operating wavelength, e.g., that is typically used for lithographic processing or another selected wavelength. The method of FIG. 6 may be performed for several wavelength that may be later used for applications processing. After a period of laser operation, the one or more tuning optics are adjusted to a 'second" position at step S63, so that the wavelength is returned to the same wavelength, e.g., the target wavelength, that it was tuned to in step S62 when the tuning optic or optics were at the first position. The first and second tuning positions are compared at step S64, or alternatively, the second tuning position is noted or stored just as the first tuning position was noted (or stored) in step S62. In the embodiment of FIG. 6, the wavelength measured by the WMS is the same at step S62, when the tuning optic or optics are at the first tuning position, as it is at step S63, after the period of laser operation and when the tuning optics or optics are at the second position. A drift compensation value for the period of operation between steps S62 and S63 and current laser operating conditions is determined at step 865. This value may be steps of adjustment of the one or more tuning optics, or if those steps are understood as corresponding to wavelength shift amounts, then the value may be in amounts of wavelength shift.

The process of FIG. 6 may be performed for several laser operating conditions and period of laser operation. For example, after another period of laser operation, the method may return to step S63 for determining another drift compensation value for another laser operating period. The method may return to step S61 at some point to operate the laser at one or more different operating conditions such as repetition rate, burst rate, output power, optical arrangement, discharge conditions, gas mixture condition or composition, gas mixture age, age of laser chamber, age of resonator optics, or other conditions as may be understood by those skilled in the art. The drift compensation values are preferably stored for many laser operating periods and conditions, so that the values may be used, e.g., in performing a process such as those described above with reference to FIGS. 3 and 4.

FIG. 7 shows some illustrative wavelength drifts with several laser operation periods that demonstrates an advantage of the preferred embodiment. The data is tabulated over several test runs and wavelength offsets are determined using a comparison with values determined using an iron hollow-cathode lamp. Data with a good tendency are marked with an "X", and show a trend in one direction. Each column shows a test run wherein wavelengths were measured periodically during the course of gas lifetimes of the laser system, which for these measurements was a KrF excimer laser.

The rows designated and indicated with reference letter "A" in FIG. 7 show measurements of acceptance tests. These measurements are tabulated as deviations from a reference line of an iron hollow cathode opto-galvanic lamp. The measurements were distributed over approximately three days, although the measurements may be taken more or less often according to preferred embodiments herein. The row showing values indicated by the reference letter "B" show total differences in measured wavelengths by the WMS over gas lifetimes. The rows designated and indicated with reference letter "C" are wavelength differences from measurement to measurement of the wavelengths measured in rows A above rows C.

After the data are measured and the differences and offsets determined, then the offsets are stored in a memory accessible by the processor 16 of FIG. 1. When the laser is operating, then the processor receives information from the detector 42 of FIG. 2 and determines the wavelength based on that information and also on the offset value corresponding with the laser operation duration or period when the values were received. In this way, although the wavelength measured by the monitor etalon may drift outside tolerances without the offset, when the offset is figured into the calculation of the wavelength, the wavelength is determined within tolerance over a long laser operation period.

A technique for compensating optical drift of a wavelength measurement system such as uses a monitor etalon or grating or prism spectrometer used for relative wavelength tuning of an output beam of an excimer or molecular fluorine laser system that meets the above objects of this invention has been described above. An output beam may be tuned to a known wavelength after calibration of the wavelength measurement system to an absolute wavelength reference. Then, the laser may be operated for a period, preferably an extended period, at the desired wavelength, and the amount of drift is measured periodically during that period. The amount of drift of the wavelength measurement system at the time of each measurement, relative to the initial zero drift when the monitor etalon is calibrated using the absolute reference line is stored in a memory accessible by an expert computer system or otherwise programmed into software of the expert system. Then, when the monitor etalon is being used during laser operation to set and/or maintain a laser output beam at a desired wavelength, the expert computer system calculates the wavelength of the output beam, e.g., by adding or subtracting an offset amount, based on a stored drift compensation value or amount corresponding to the extent of the period or duration since the monitor etalon was initially calibrated, to the wavelength measured, calculated and/or determined from the output of the monitor etalon. In this way, the optical drift of the monitor etalon is compensated without incurring laser downtime, even though the drift of the monitor etalon may be otherwise greater than an allowed tolerance of error in the wavelength determination.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A method for compensating optical drift of a wavelength measurement system used for relative wavelength tuning of an output beam of an excimer or molecular fluorine laser system, comprising the steps of:
   (a) operating the laser system including generating a laser beam and directing a beam portion through the wavelength measurement system;
   (b) calibrating the wavelength measurement system to an absolute reference;
   (c) tuning the output beam to a target wavelength using the wavelength measurement system;
   (d) detecting a measured wavelength of the output beam using the wavelength measurement system after a predetermined period of laser operation;
   (e) calculating a compensated wavelength by figuring in a previously determined measurement system drift compensation value; and
   (f) adjusting the wavelength of the laser beam to the target wavelength when the compensated wavelength differs from the target wavelength.

2. The method of claim 1, further comprising the step of repeating steps (d) through (f) a number times after additional periods of laser operation.

3. A method for operating an excimer or molecular fluorine laser system at a stabilized wavelength, the laser system including a wavelength measurement system calibrated to an absolute reference, for relative wavelength tuning, comprising the steps of:
   (a) operating the laser system including generating a laser beam and directing a beam portion through the wavelength measurement system;
   (b) calibrating the wavelength measurement system to an absolute reference;
   (c) determining the wavelength of the laser beam, said wavelength determining step comprising the steps of:
      (i) transmitting wavelength information measured by said wavelength measurement system;
      (ii) retrieving a drift compensation value for the measurement system stored as corresponding to a current laser system operating condition; and
      (iii) calculating the wavelength of the laser beam based on the transmitted wavelength information and the retrieved drift compensation value for the measurement system; and
   (d) tuning the wavelength to a target wavelength when the determined wavelength differs from the target wavelength.

4. The method of claim 3, further comprising the step of repeating steps (c) through (d) a number times after additional periods of laser operation.

5. A method for preparing an excimer or molecular fluorine laser system to operate at a stabilized wavelength by compensating optical drift of a wavelength measurement system used for relative wavelength tuning of an output beam of the excimer or molecular fluorine laser system, comprising the steps of:
   (a) operating the laser system including generating a laser beam and directing a beam portion through the wavelength measurement system;
   (b) calibrating the wavelength measurement system to an absolute reference;
   (c) determining a value of the wavelength of the laser beam measured by the wavelength measurement system after a predetermined period of laser operation;
   (d) comparing the value of the wavelength measured by the wavelength measurement system after said predetermined period of laser operation with an actual value of the wavelength of the laser beam; and
   (e) determining a drift compensation value for the measurement system based on a result of the comparing step.

6. The method of claim 5, further comprising the steps of:
   (f) repeating steps (c) through (e) a number times after additional periods of laser operation; and
   (g) storing the drift compensation values for the measurement system versus laser operation period of said wavelength measurement system for use with a wavelength stabilization routine of said laser system.

7. A method for preparing an excimer or molecular fluorine laser system to operate at a stabilized wavelength by compensating optical drift of a wavelength measurement system used for relative wavelength tuning of an output beam of the excimer or molecular fluorine laser system, comprising the steps of:
   (a) operating the laser system including generating a laser beam at a target wavelength by orienting a tuning optic of the laser system at a first position and directing a beam portion through the wavelength measurement system;
   (b) calibrating the wavelength measurement system to an absolute reference;

(c) orienting said tuning optic to a second position such that the wavelength of the laser beam measured by the wavelength measurement system after a predetermined period of laser operation is at the target value;

(d) comparing the first position with the second position of the tuning optic; and (e) determining a drift compensation value for the measurement system based on a result of the comparing step.

8. The method of claim 7, further comprising the steps of:

(f) repeating steps (c) through (e) a number times after additional periods of laser operation; and (g) storing the drift compensation values versus laser operation period for use with a wavelength stabilization routine of said laser system.

9. The method of any of claim 1, 3, 5 or 7, further comprising the steps of calculating and storing data corresponding to corrected offsets for the wavelength measurement system following recalibration to the absolute reference.

10. The method of any of claim 1, 3, 5 or 7, wherein the wavelength measurement system comprises a monitor etalon.

11. The method of claim 10, wherein the drift compensation values are determined by comparing wavelength values determined using the monitor etalon with values determined using a calibrated spectrometer in a test run.

12. The method of claim 10, wherein the drift compensation values are determined by comparing wavelength values determined using the monitor etalon with values determined using a reference optical transition line.

13. The method of claim 10, wherein the drift compensation values are determined by comparing wavelength values determined using the monitor etalon with values determined using a second monitor etalon that is re-calibrated periodically, such that magnitudes of the drift compensation values are determined as the difference between the wavelengths measured by the first and second monitor etalons.

14. The method of claim 10, wherein the drift compensation values are tabulated with each entry in a table corresponding to a drift compensation value at a different amount of laser operation for a given set of laser operation conditions.

15. The method of claim 14, wherein the amount of laser operation is measured versus a parameter that generally increases as the laser operates, wherein that parameter is selected from the group of parameters consisting of as time, pulse count, input energy to the discharge, and total output energy.

16. The method of claim 15, wherein different tables are generated corresponding to differing values of laser operation conditions including at least one condition selected from the group of conditions consisting of repetition rate, burst rate, output power, optical arrangement, discharge conditions, gas mixture composition, gas mixture age, age of laser chamber and age of resonator optics.

17. The method of claim 10, wherein the drift compensation values are calculated from a function that is generated corresponding to measured amounts of drift of the monitor etalon versus periods of laser operation.

18. The method of claim 17, wherein the amount of laser operation is measured versus a parameter that generally increases as the laser operates, wherein that parameter is selected from the group of parameters consisting of as time, pulse count, input energy to the discharge, and total output energy.

19. The method of claim 18, wherein different tables are generated corresponding to differing values of laser operation conditions including at least one condition selected from the group of conditions consisting of repetition rate, burst rate, output power, optical arrangement, discharge conditions, gas mixture composition, gas mixture age, age of laser chamber and age of resonator optics.

* * * * *